Patented Dec. 29, 1936

2,066,125

UNITED STATES PATENT OFFICE 2,066,125

PROCESS OF MANUFACTURING MIXED ETHERS OF HIGHER ALCOHOLS WITH POLAR GROUPS AND APPLICATION OF THE SAME FOR TEXTILE PURPOSES

Meindert Danius Rozenbroek, Delden, Twenthe, Overijsel, Netherlands

No Drawing. Application April 29, 1933, Serial No. 668,670. In the Netherlands May 2, 1932

10 Claims. (Cl. 252—1)

The invention relates to processes for treating fibrous materials including leather which comprises carrying out the treating process in the presence of a sulphonated mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups. Hydroxy compounds of this character are hydroxy aldehydes, hydroxy ketones, hydroxy carboxylic acids, hydroxy-amino compounds and hydroxy mercaptans.

The invention also relates to treatment baths for the textile and leather industry containing the above mentioned ethers, e. g. cleansing, wetting, bleaching, dyeing, finishing, and oiling baths, spinning baths for the artificial silk industry and dispersions of insoluble substances, such as fatty acids, waxes, alcohols and hydrocarbons.

By higher alcohols I mean alcohols with eight or more carbon atoms. The said alcohols may be saturated or unsaturated and monohydric or polyhydric. An example of a polyhydric alcohol is octadecanediol, obtained by reduction of ricinoleic acid. The second or the further OH groups of the higher alcohol may be substituted by an acyl group or by an ether group so that in the latter case the higher alcohol used for etherification is already an ether itself. The higher alcohol may further contain substituents, e. g. halogens. I may use the synthetic alcohols e. g. alcohols obtained by reduction of fatty acids and their esters or by oxidation of paraffin, but I can also use naturally occurring alcohols or alcohol mixtures obtained from naturally occurring products, e. g. wax alcohols or wool fat alcohols.

The hydroxy group or groups in the hydroxyaldehydes, hydroxyketones, hydroxycarboxylic acids, hydroxyamino compounds and hydroxymercaptans, may be in the α position or any other position with respect to the carbonyl, carboxyl, amino or mercapto group. The compounds may contain one or more of the last mentioned groups. The hydroxy groups which are not etherified with the higher alcohol may be etherified with other alcohols or esterified.

By introducing a sulphuric acid ester or sulphonic acid group the solubility of the mixed ether in water is substantially increased and the properties are modified. The sulphuric acid ester or sulphonic acid group must be present in the hydroxy compound component and can be introduced by conversion of a free hydroxy group, if present, or of any of the other groups in the hydroxy compound into the sulphur containing group. The sulphuric acid ester or sulphonic acid group may also be introduced in the form of taurine and homologues, ethionic acid and homologues, isethionic acid and homologues, hydroxy derivatives of the same and homologues, hydroxy methane sulphonic acid, hydroxy propane monosulphonic acid and homologues, hydroxypropane disulphonic acid and homologues.

If desired the sulphonated mixed ether may also contain a residue of a completely esterified acid containing hydrogen which can be substituted by alkalimetals, e. g. malonic ester, or the residue of the corresponding ether acid.

The sulphonated ethers described above can be used in any desired form. I can take for example the solutions obtained in the manufacturing process, preferably after neutralizing the same, e. g. with alkali or alkaline earth metal hydroxides, ammonia, primary, secondary or tertiary amines, ammonium bases or hydroxyamines.

The sulphonated mixed ethers used according to the invention are of great importance as assistants in the textile and leather industry, for cleansing, wetting, bleaching, dyeing, finishing, oiling, for manufacturing emulsions of substances insoluble in water, such as fatty acids, waxes, alcohols and hydrocarbons, etc. They are added to the treatment baths, generally in small amounts. They can also be used together with other cleansing, wetting, dispersing and emulsifying agents.

Furthermore, the properties of substances which in themselves do not possess any foaming and wetting properties, but show a cleansing effect such as vegetable mucilaginous substances and some polysaccharides may be improved considerably by adding one or more of the sulphonated ethers. In this way soap-like substances are obtained which possess all the advantages of ordinary soaps without their disadvantages such as hydrolysis, sensibility to alkaline earths, precipitation by salts, sensibility even to weak acids etc.

Even small additions of the substances used according to the invention will improve the washing effect of some salts, e. g. soda, sodiumsesquicarbonate, waterglass, trisodium phosphate.

As further applications in the fibrous material industry may be mentioned the use of the ethers described for keeping certain precipitates in colloidal dispersion, e. g. the precipitates produced when making goods waterproof or in the beater in paper manufacture.

They can also be used for sizing and finishing textile fabrics as they allow a more uniform distribution of the sizing paste to be obtained and impart a soft and full feel to the textile materials, even when the sizing paste contains alkaline earth salts, such as magnesium chloride.

For the leather industry the ethers derived from hydroxyaldehydes are particularly valuable.

The manufacture of the compounds according to the invention will be illustrated by the following examples.

Example I 342 parts by weight of dilauryldiglycolether, the formula of which is $LOCH_2.CH_2OCH_2.CH_2OL$ (L is the lauryl group) are sulphonated with 75–300 parts by weight of a mixture of oleum and phosphoric acid. The neutralized sulphonation product readily dissolves in water, foams excellently and has a high wetting power.

Instead of the above mentioned sulphonation mixture also other sulphonating agents may be used such as sulphuric acid, sulphurtrioxide, chlorosulphonic acid or mixtures of the same.

Example II 100 parts by weight of monolauryl $\alpha$ glycerol ether are sulphonated with 92 parts by weight of sulphuric acid. This sulphonation product is soluble in 5% sulphuric acid, in diluted and concentrated magnesium sulphate and magnesium chloride solutions.

Example III 261 parts by weight of monolauryl $\alpha$ glycerol ether are treated with dry hydrochloric acid gas. An increase of weight of 21 g. is obtained and a compound is formed in which one of the free OH groups of the glycerol component is substituted by chlorine, i. e. the monolauryl ether of monochlorhydrine. Ammonia gas is introduced into this product whereby the chlorine atom is substituted by a $NH_2$ group.

Example IV 100 parts by weight of the amine obtained according to Example III are sulphonated with 184 parts by weight of $H_2SO_4$. A product is obtained which easily dissolves in water, foams strongly (a permanent foam is obtained in a dilution of even 1 to 100,000 parts of water) and shows a wetting power which calculated per mol., exceeds that of most other substances used for the same purpose.

Example V 261 parts by weight of monolauryl $\alpha$ glycerol ether are converted into the disodium salt by a treatment with metallic sodium and then condensed with glycol chlorohydrine. In the ether obtained one or more of the free OH groups are substituted by chlorine according to well known methods; by introducing ammonia gas the chlorine compound is converted into the corresponding aminocompound.

If desired the product obtained in this way may further be sulphonated.

Example VI 182 parts by weight of sodium diethylmalonic ester are condensed with 278.5 parts by weight of monolaurylether of monochlorohydrin. The product is saponified, after which the free OH group is esterified by sulphonating with sulphuric acid.

Example VII 426 parts by weight of phosphorus pentoxide are mixed with ether and the mixture is cooled. 261 parts by weight of monolauryl $\alpha$ glycerolether are slowly added during which the temperature will rise considerably. The ether is then evaporated.

Example VIII 284 parts by weight of sodium monolauryl $\alpha$ glycerolether are condensed with 93.5 parts by weight of monochloroacetamide.

Example IX 230 parts by weight of monolaurylglycolether are sulphonated and the sulphonate is neutralized. The product obtained is treated with a potassium-hydrosulphide solution whereby the $SO_3Na$ group is substituted by SH.

Example X

The product obtained according to Example IX is carefully oxidized with nitric acid whereby a true sulphonic acid is obtained.

Example XI 280 parts by weight of monolauryl ether of monochlorohydrin are treated in a known way with sodium sulphite under pressure. Mixtures of sodium sulphite and soda may also be used.

Example XII 308 parts by weight of sodium cetylglycol ether are condensed with 122.5 parts by weight of monochloroacetic acid ethyl ester. The product obtained is saponified and then condensed with 111 parts by weight of taurine. If desired the chloride may be manufactured first from the carbonic acid and subsequently be used for the condensation.

Example XIII 226 parts by weight of sodium mononaphthenic alcohol glycerolether are treated with 122.5 parts by weight of monochloroacetic acid ethyl ester. The substance obtained is saponified and treated with 270 parts by weight of ethionic acid. The naphthenic alcohol used may be produced from the commercial naphthenic acid such as it is in the market. If desired the chlorid may first be manufactured from the carbonic acid and then be used for the condensation.

Example XIV

Dry hydrochloric acid gas is introduced into 261 parts by weight of monolauryl $\alpha$ glycerolether until the increase of weight will be 21 parts. The chlorine compound is treated with 60 parts by weight of ethylenediamine.

Example XV 390 parts by weight of sodium oleylate are treated with 112 parts by weight of chloroglycolic acid. The condensation product is converted into chloride with $PCl_5$. Then ammonia gas is introduced into the product to form an acid amide.

Example XVI

The carbonic acid chloride obtained according to the preceding example is condensed with about 110 parts by weight of diethylethylenediamine.

Example XVII 100 parts by weight of laurylhydroxymethanecarboxychloride ($C_{12}H_{25}OCH_2COCl$) are mixed with 50 parts by weight of the sodium salt of isethionic acid and carefully heated. The product obtained is soluble in water and stable against acids.

Example XVIII 100 parts by weight of the sodium salt of chloroethane sulphonic acid are heated for a short time with 200 parts by weight of the sodium salt of oleylhydroxymethanecarbonic acid $$(C_{17}H_{33}OCH_2COONa)$$

and at the same time agitated. The product obtained is soluble in water and very stable.

Example XIX 200 parts by weight of the sodium alkylate of stearyl glycol ether are mixed with 50 parts by weight of the sodium salt of chloroethane sulphonic acid and the mixture is heated until the product is soluble in water.

Example XX 380 parts by weight of the sodium salt of monostearyl α glycerol ether are condensed with 150 parts by weight of the sodium salt of chloromethane sulphonic acid.

Example XXI 350 parts by weight of olenoylhydroxymethanecarboxylchloride ($C_{17}H_{33}OCH_2COCl$) are mixed with 270 parts by weight of the sodium salt of hydroxypropane disulphonic acid. The mixture is heated for a long time until hydrochloric acid is no further developed. Most probably a substance of the following composition will be produced:

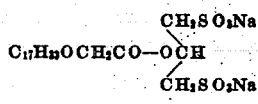

Example XXII 280 parts by weight of monolauryl α glycerol γ chloro ether are heated for a short time with sodium tricarballylicacid methylester. The product obtained in this way which if desired may be saponified, has strong foaming properties. The foam is very stable. The formula of the product is probably

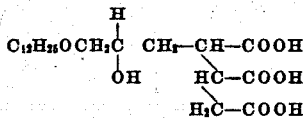

By careful sulphonation a further sulphuric acid group may be introduced whereby the properties of the substance are still further improved.

The use of the products the manufacturing processes of which have been described above will be illustrated by the following examples.

Example XXIII

In order to obtain an equal wetting of rough or bleached or dyed cotton a bath is prepared containing on each liter 1–5 g. of the product obtained by sulphonating dilauryldiglycolether with a mixture of oleum and phosphoric acid. The cotton is treated with the bath by which the fibres are fully wetted in a very short time.

Instead of the above mentioned product the manufacturing process of which is described in Example I the products obtained according to the Examples II, IV, VI, X, XI, XII, XIII and XVII may also be used.

The use of the above mentioned compounds shows the following advantages:

(1) A very thorough wetting is obtained, even with small additions;

(2) the water used, even if it is very hard, will not cause any undesired precipitates;

(3) the dyed goods, even if they are dyed with sensitive colours will not "bleed" or come off, because the added compounds are not hydrolized like ordinary soap and therefore do not cause an alkaline reaction of the bath;

(4) if desired even salts may be added to the bath e. g. sodium chloride, sodium sulphate and even magnesium sulphate, without causing undesired phenomena such as precipitation of the solid compounds and the formation of alkaline earth soaps.

Example XXIV

The same substances may be used for wetting and acidifying. For carbonizing wool e. g. I may use e. g. 1–5 parts by weight of the sulphonation product of monolaurylalphaglycerol ether to 1000 parts by weight of 3–5% sulphuric acid. Also here the wetting takes place very quickly. The acid which is present will not cause any precipitations. Instead of dilute acid a mixture of dilute acid with e. g. bisulphate may be used. Even baths containing magnesium chloride may be used.

Instead of the above mentioned product, the manufacture of which is described in Example II also the products obtained according to the Examples III, IV, V, X, XI, XII, XIV, XVI, XXI and XXII may be used.

The absence of hydrolysis even at increased temperatures is a special advantage for improving processes of wool e. g. washing, fulling, dyeing and the like. The high stability against acids enables to use detergent agents even in acid liquids and to carry out treating processes which previously had to be applied separately in one operation, e. g. cleansing and fulling.

The mixed ethers with polar groups may be used together with ordinary soaps whereby the latter are made stable to a certain degree against hard water, because the alkaline earth soaps which may be formed remain dispersed. The foaming properties are highly increased and the soaps are much more difficultly precipitated by salts so that they are suitable for washing in seawater.

Example XXV

To a coconut oil soap, ready boiled, I add 5% of the product obtained by condensation of sodium oleylate with bromotricarballyllic acid methylester and subsequently saponified and neutralized. The soap thus obtained not only has much better foaming properties than coconut oil soap alone, but the foam is more permanent.

Instead of the above mentioned product manufactured according to Example IX I may also use the substance obtained according to Example XI.

The above mentioned compounds having a high emulsifying power are suitable as emulsifying agents for fats, hydrocarbons and other substances insoluble in water, if desired together with other known emulsifying agents such as Turkey red oil, gelatine, butylnaphthalenesulphonic acid and the like. For this reason they are valuable ingredients for oiling fibres and for the manufacture of oiling agents, i. e. emulsions or emulsifiable preparations of fats, fatty acids and/or hydrocarbons.

The same emulsifying properties enable to apply these substances for dispersing cleansing agents which are insoluble in water, such as tetraline, methylhexaline, butylalcohol and the like. They may be applied per se or in combination with other substances known for this purpose.

The dispersing properties of the same may further be utilized for dispersing coal tar dyes as used in the textile and leather industry. The dyeing effect is more uniform and the duration of the process is reduced.

Example XXVI

On the weight of the goods to be treated I take:
2½% of a substantive dyestuff such as sulpho orange,
10–20% Glauber salt,
2–3% acetic acid 8° Bé.,
0.1% sulphonated monolaurylalphaglycerolether which is previously dissolved and added immediately to the dyeing bath.

The dyeing effect is more uniform and dyeing proceeds more quickly than without the addition of sulphonated laurylether.

Still better effects are obtained, when using in wetting, bleaching and dyeing baths besides the mixed ethers with polar groups other dispersing agents which per se do not show any wetting properties such as pyridine, dioxane, morpholine, butyl- and other amines and the like. An improved dispersing power is then obtained together with a high wetting effect and a substantial independence of the degree of hardness and the amount of acid in the bath.

Example XXVII

I prepare a mixture of:
1 part by weight of pyridine
1 part by weight of dioxane
1 part by weight of amidated and then sulphonated monolaurylalphaglycerolether, the manufacturing process of which is described in Example IV,
5 parts by weight of water.

Of this mixture 0.2% is used as an addition in the dyeing process described in Example XXVI, the dyestuff is first mixed with some water and the mixture mentioned above and then added to the dyeing bath.

Example XXVIII 400 g. of an ice dyestuff component, e. g. naphtol AS, are stirred with 300 cc. of Turkey red oil and 600 cc. of a 0.1% solution of the compound mentioned in Example XXVII. I now add 900 cc. of a caustic soda solution of 40° Bé. and 100 g. dissolved glue and the mixture is diluted with hot water to 100 liters. With this mixture the cotton is impregnated at 30° C. after which coupling with the diazo component is effected in the usual way.

Furthermore the properties of substances which in themselves do not possess any foaming and wetting properties, but show a cleansing effect such as vegetable mucilaginous substances, polysaccharides may be improved considerably by adding one or more of the ethers with polar group dealt with in this patent application. In this way soaplike substances are obtained which possess all advantages of ordinary soaps without their disadvantages such as hydrolysis, sensibility to alkaline earths, precipitation by salts, sensibility even to weak acids, etc.

Even small additions of the substances used according to the invention will improve the washing effect of some salts, e. g., soda, sodium sesquicarbonate, waterglass, trisodium phosphate. The invention therefore also covers the application of a mixture of one or more of these salts with the mixed ethers provided with a polar group.

As further applications in the industries of fibrous materials may be mentioned the use of the same for keeping certain precipitates in colloidal dispersion e. g. the precipitates produced when making goods waterproof or in the beater in the paper manufactury, or in manufacturing varnishes. The substances in question are also suitable as additions to coagulating baths as used in the artificial silk industry.

They are also of importance in the leather industry for general purposes. I can use e. g. ethers which not only contain a polar group but also an aldehyde group which latter group by its nature combines with the leather. The polar group may also be combined directly to the aldehyde group.

Example XXIX 264 parts by weight of sodium cetylate are condensed with 78.5 parts by weight chloroacetaldehyde. The ether formed is then treated with sodium bisulphite, whereby a soluble substance of the following composition is obtained:

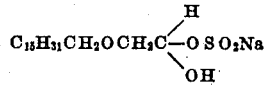

1–5% of this compound is added to the vat liquor. In this way the emulsion is finely divided and therefore penetrates more easily into the leather; the added compound is better incorporated into the leather.

The ethers with polar groups may also be used for sizing and finishing fibres, because they allow a more uniform distribution of the sizing paste and impart a soft and full touch to the goods, even when the sizing paste contains alkaline earth salts such as magnesium chloride, etc.

Example XXX

Dyed artificial silk is treated at ordinary temperature during a short time with a bath containing 0.1% of the ether mentioned in Example XXVII and is then dried without rinsing. The artificial silk is very soft and supple to the feel.

I claim:

1. A process for treating fibrous materials including leather comprising carrying out the treating process in the presence of a sulphonated mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

2. A process for treating fibrous materials including leather comprising carrying out the treating process in the presence of a sulphonated mixed ether of a polyhydric alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

3. A process for treating fibrous materials including leather comprising carrying out the treating process in the presence of a taurin derivative of a mixed ether of an alcohol containing at least 8 carbon atoms with a hydroxycarboxylic acid containing not more than 6 carbon atoms and not more than 4 hydroxy groups, the carboxylic group being combined with the nitrogen atom of taurin.

4. A process for treating fibrous materials including leather comprising carrying out the treating process in the presence of an ethionic acid derivative of a mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups, one of the hydroxy groups being etherified with the hydroxy group of ethionic acid.

5. A process for treating fibrous materials including leather comprising carrying out the treating process in the presence of an isethionic acid derivative of a mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups, one of the hydroxy groups being etherified with the hydroxy group of isethionic acid.

6. A treatment bath comprising a treatment liquid and in addition thereto a sulphonated mixed ether of a polyhydric alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

7. A spinning bath in the artificial silk industry comprising a coagulating liquid and in addition thereto a sulphonated mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

8. A spinning bath in the artificial silk industry comprising a coagulating liquid and in addition thereto a sulphonated mixed ether of polyhydric alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

9. A dispersion of insoluble substances in aqueous liquids containing as an emulsifying agent a sulphonated mixed ether of an alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

10. A dispersion of insoluble substances in aqueous liquids containing as an emulsifying agent a sulphonated mixed ether of a polyhydric alcohol containing at least 8 carbon atoms with a compound having not more than 6 carbon atoms and containing at least one and not more than 4 hydroxy groups and at least one reactive radical of the group consisting of carbonyl, carboxyl, amino and mercapto groups.

MEINDERT DANIUS ROZENBROEK.